Feb. 16, 1932. D. H. KEISER, JR 1,845,798
SHEARS
Filed May 5, 1931 2 Sheets-Sheet 1
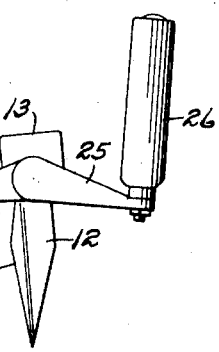
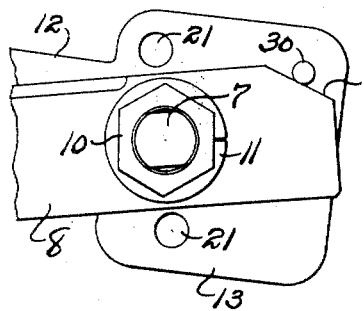
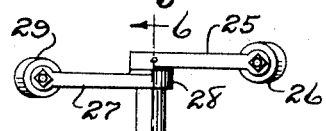
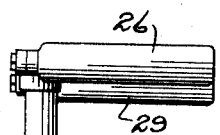
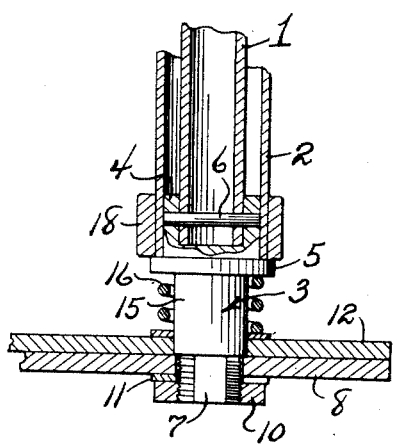
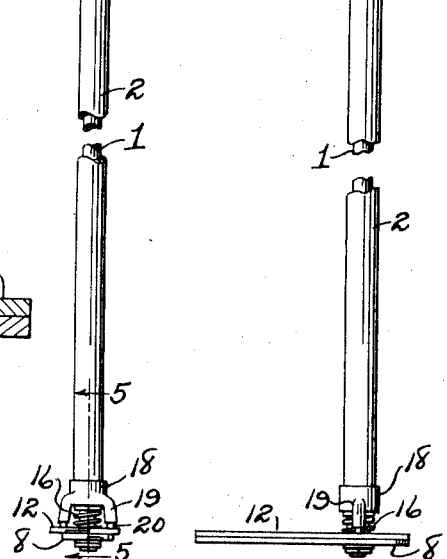
D. Howard Keiser, Jr. INVENTOR
BY Victor J. Evans and Co. ATTORNEYS Feb. 16, 1932. D. H. KEISER, JR 1,845,798
SHEARS
Filed May 5, 1931 2 Sheets-Sheet 2

D. Howard Keiser, Jr. INVENTOR
BY Victor J. Evans
and Co. ATTORNEYS

Patented Feb. 16, 1932

1,845,798

UNITED STATES PATENT OFFICE

DAVID HOWARD KEISER, JR., OF WYOMISSING HILLS, PENNSYLVANIA

SHEARS

Application filed May 5, 1931. Serial No. 535,228.

This invention relates to shears especially adaptable for cutting grass and other growths or lawns and like places and has for the primary object, the provision of a device of the above stated character, whereby a person standing in an upright position may easily and quickly cut grass which is close to curbing and other objects and obviates the necessity of the person assuming a bent over or cramped position in order to operate the cutting blades of the shears.

Another object of this invention is the provision of operating members fitting one within the other and carrying at their lower ends cutting blades movable relative to each other by the operation of handles secured to the upper ends of the operating members, whereby a person in a standing position may cut growth as close to the surface of the ground as desired and especially in inaccessible places where such growth cannot be cut by a mower.

A further object of this invention is the provision of a device of the above stated character which will consist of a small number of parts and provide a rigid construction when in operation and which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating shears constructed in accordance with my invention.

Figure 2 is a rear elevation illustrating the same.

Figure 3 is a side elevation illustrating the device.

Figure 4 is a fragmentary bottom plan view illustrating the relation of the cutting blades to each other.

Figure 5 is a fragmentary sectional view taken on the line 5—5 of Figure 2.

Figure 6:
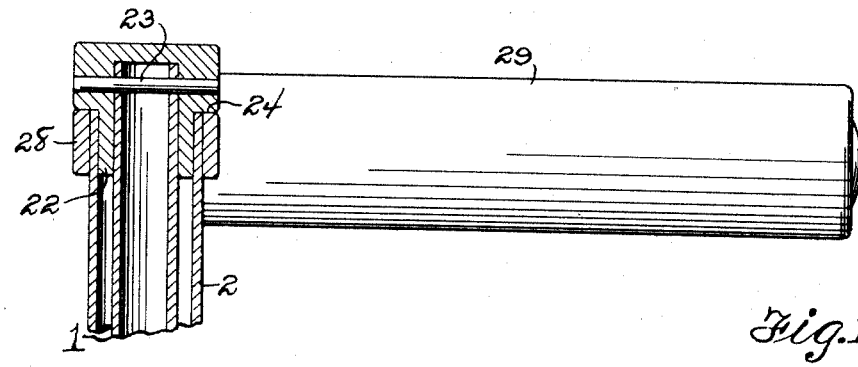
Figure 6 is a fragmentary sectional view taken on the line 6—6 of Figure 2.
Figure 7:
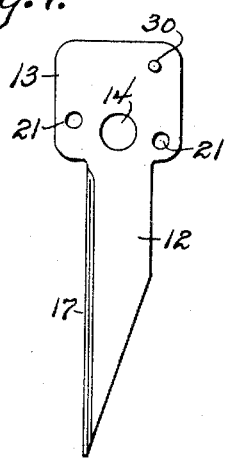
Figure 7 is a plan view illustrating the upper cutting blade.
Figure 8:
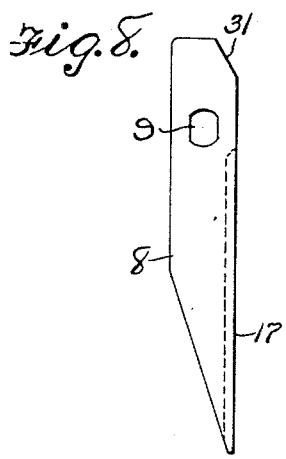
Figure 8 is a similar view illustrating the lower cutting blade.

Referring in detail to the drawings, the numerals 1 and 2 indicate operating members, one fitting within the other as clearly shown in Figure 2. A blade attaching member 3 has formed integral with one end a sleeve 4 and an annular flange 5, the sleeve receiving the lower end of the member 1 and secured thereto by a pin 6, with the lower end of the member 2 resting on the flange 5. The other end of the attaching member 3 has formed integral therewith a reduced screw-threaded extension 7 on which is secured a lower blade 8 having an elongated opening 9 to receive the extension 7 so that the blade 8 will be locked to the extension 7 against relative movement with the blade attaching member 3. A nut 10 is threaded to the extension 7 and forces a washer 11 against the under face of the blade 8. An upper blade 12 has a substantially rectangular head or plate 13 formed thereon and provided with a circular opening 14 to receive the cylindrical portion 15 of the blade attaching member 3 and the upper blade 12 is adapted to have free movement relative to the blade attaching member 3. An expansion spring 16 is interposed between the flange 5 and the upper blade 12 for holding the latter in tight engagement with the lower blade 8. The blades 8 and 12 are provided with cutting edges 17 and have their free ends reduced or pointed to facilitate the operation of the device in close places.

A collar 18 is secured to the lower end of the operating member 2 and has formed integral therewith arms 19 provided with reduced ends 20 fitting within openings 21 of the head 13 of the upper blade 10.

A sleeve 22 is secured to the upper end of the operating member 1 by a pin 23 and is provided with an annular shoulder 24 to be engaged by the upper end of the operating member 2, preventing the member 2 from moving upwardly relative to the member 1. The sleeve 22 is formed integral with a laterally extending arm 25 carrying a right angularly disposed handle 26. A similar arm 27 to the arm 25 is formed integral with the collar 28 which is shrunk or otherwise secured to the upper end of the member 2 and which has abutting engagement with the shoulder 24 as shown in Figure 6. The arm 27 carries a right angularly disposed handle 29, whereby a person standing in an upright position may grip the handles 26 and 29 and operate the cutting blades toward and from each other for the purpose of causing the cutting edges to sever growth caught between the blades.

A stop 30 is carried by the head or plate 13 of the upper plate 12 and said blades when moved in full cutting position relative to each other is adapted to engage a bevelled end 31 of the lower blade 8 to limit the movement of said blades in one direction or in a direction beyond a full cutting position.

With the blades 8 and 12 mounted on the members 1 and 2 in the manner described and illustrated it will be noted that the blades can be easily removed when it is desired to sharpen them or for any other purpose, and further it will be noted that the upper blade will be yieldably held in engagement with the lower blade 8 with sufficient tension to provide the desired cutting action between the blades.

Figure 9:
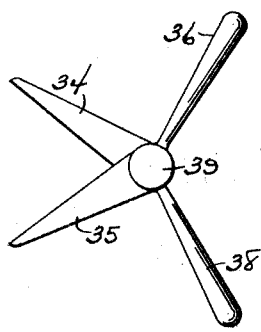
Figure 9 is a top plan view illustrating a modified form of my invention.
Figure 10:
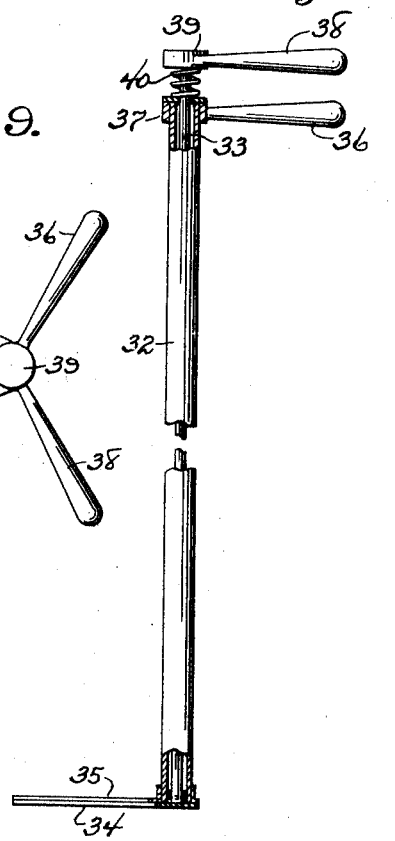
Figure 10 is a side elevation partly in section illustrating the same.

Referring to my modified form of invention as shown in Figures 9 and 10, the numeral 32 indicates the outer operating member while the numeral 33 indicates the inner operating member and the latter projects beyond the ends of the member 32 and has secured to its lower end a blade 34 similar in construction to the blade 8. The lower end of the member 32 rests upon the member 34 and has secured thereto an upper blade 35 having a cutting portion similar in construction to the blade 12. A handle 36 having an integral collar 37 is secured to the upper end of the member 32 while a handle 38 having an integral collar 39 is secured to the upper end of the inner operating member 33. An expansion spring 40 is interposed between the upper end of the member 32 and the collar 39 attached to the upper end of the member 33 for the purpose of yieldably holding the blades 34 and 35 in engagement with each other. By moving the handles 36 and 38 toward and from each other, a corresponding movement will be imparted to the blades 34 and 35, consequently causing the cutting edges thereof to sever the growth between the blades.

While I have shown and described the preferred embodiment of my invention, it will be understood that minor changes in construction, combination and arrangement of parts may be made without departing from the spirit and scope of my invention, as claimed.

Having thus described my invention, what I claim is:

1. Shears comprising operating members, one of said operating members journalled in the other operating member, a blade attaching member secured to the inner member, an annular flange formed on said attaching member and engaged by one end of the outer member, a lower blade removably secured to the attaching member, an upper blade journalled on the attaching member, tension means between the flange and upper blade, a collar secured to the outer member, arms carried by said collar and detachably connected to the upper blade, and handles connected to the inner and outer members for moving the upper blade relative to the lower blade.

2. Shears comprising operating members, one of said operating members journalled in the other operating member, a blade attaching member secured to the inner member, an annular flange formed on said attaching member and engaged by one end of the outer member, a lower blade removably secured to the attaching member, an upper blade journalled on the attaching member, tension means between the flange and the upper blade, means detachably securing the upper blade to the outer member, and handles connected to the inner and outer members for moving the upper blade relative to the lower blade.

In testimony whereof I affix my signature.

DAVID HOWARD KEISER, JR.